(12) United States Patent
Yan et al.

(10) Patent No.: US 8,952,200 B2
(45) Date of Patent: Feb. 10, 2015

(54) LIQUID CRYSTAL OLIGOMER, SYNTHESIS COMPOSITION, PREPARATION METHOD THEREOF, AND LIQUID CRYSTAL MATERIAL

(75) Inventors: Wei Yan, Beijing (CN); Dan Wang, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 93 days.

(21) Appl. No.: 13/446,765

(22) Filed: Apr. 13, 2012

(65) Prior Publication Data
US 2012/0264980 A1 Oct. 18, 2012

(30) Foreign Application Priority Data

Apr. 14, 2011 (CN) .......................... 2011 1 0093832

(51) Int. Cl.
*C07C 45/64* (2006.01)
*C08G 65/40* (2006.01)

(52) U.S. Cl.
CPC ............ *G09K 19/20* (2013.01); *C08G 65/4012* (2013.01); *C08G 2650/60* (2013.01); *C08G 2650/66* (2013.01)
USPC .......................................... 568/315; 568/333

(58) Field of Classification Search
USPC ................................................. 568/315, 333
See application file for complete search history.

(56) References Cited

U.S. PATENT DOCUMENTS 5,312,994 A 5/1994 Bryant et al.

FOREIGN PATENT DOCUMENTS

| CN | 1557856 A | 12/2004 |
|---|---|---|
| CN | 101759546 A | 6/2010 |

OTHER PUBLICATIONS

Knudsen et al. Blends of reactive diluents with phenylethynyl-terminated arylene ether oligomers. High Performance Polymers, 1996, vol. 8, (1), 57-66; HCAPLUS abstract, Document No. 124:261948.*
Xianhua Rao, et al; "Design and Synthesis of a Tribranched Phenylethynyl-Terminated Aryl Ether Compound and Its Use as a Reactive Diluent for PETI-5", Journal of Polymer Science: Part A: Polymer Chemistry, vol. 45, pp. 4844-4854; Nov. 1, 2007.
Chinese First Office Action dated Sep. 17, 2013; Appln. No. 201110093832.9.
Second Chinese Office Action dated Apr. 30, 2014; Appl. No. 201110093832.9.
Chinese Rejection Decision dated Aug. 1, 2014; Appl. No. 201110093832.9.

* cited by examiner

*Primary Examiner* — Sikarl Witherspoon
(74) *Attorney, Agent, or Firm* — Ladas & Parry LLP

(57) ABSTRACT

The disclosed technology provides a liquid crystal oligomer, a synthesis composition, a preparation method thereof, and a liquid crystal material. The liquid crystal oligomer is represented by the following chemical formula, wherein substituent R is hydrogen or methyl. In addition to a higher glass transition temperature, good heat resistance, low viscosity and a self-crosslinkable group, the liquid crystal oligomer has thermal self-crosslinking and high thermal stability of thermosetting materials.

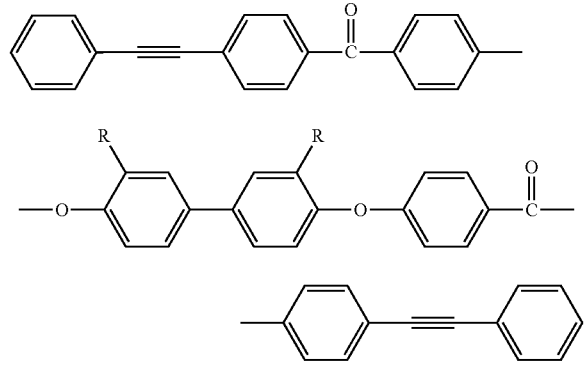

9 Claims, 3 Drawing Sheets

LIQUID CRYSTAL OLIGOMER, SYNTHESIS COMPOSITION, PREPARATION METHOD THEREOF, AND LIQUID CRYSTAL MATERIAL

BACKGROUND

Embodiments of the disclosed technology relate to a liquid crystal oligomer, a synthesis composition, a preparation method, and a liquid crystal material.

Liquid crystal displays (LCDs) are a kind of flat thin display device, which comprises a plurality of color or black and white pixels and is placed in front of a light source or the reflector side of the light source. LCDs have the advantages such as low power consumption, thin profile, low radiation, soft vision and no harm to eyes, and thus have become popular and suitable for portable electronic equipments with a battery or batteries.

Liquid crystal material is a core component of the liquid crystal display. The existing liquid crystal materials are typically selected for use at the room temperature. Even if the maximum operating temperature of the existing liquid crystal materials, it is only about 80 centigrade (° C.). However, display at a higher temperature such as 200° C. or higher may be required in the special applications such as aviation or military. Apparently, the liquid crystal materials would change from liquid crystalline state into transparent liquid or even are evaporated at this temperature, and therefore lose its anisotropy, affecting display effect seriously. Therefore, developing a liquid crystal material which can be used at high temperatures has become necessary.

SUMMARY

Embodiments of the disclosed technology provide a liquid crystal oligomer, a synthesis composition for the self-crosslinkable liquid crystal oligomer, a preparation method, and a liquid crystal material. The liquid crystal oligomer has thermal self-crosslinking and high thermal stability of thermosetting materials in addition to a higher glass transition temperature, good heat resistance, low viscosity and a self-crosslinkable group.

An embodiment of the disclosed technology provides a self-crosslinkable liquid crystal oligomer, wherein the oligomer is represented by the following chemical formula:

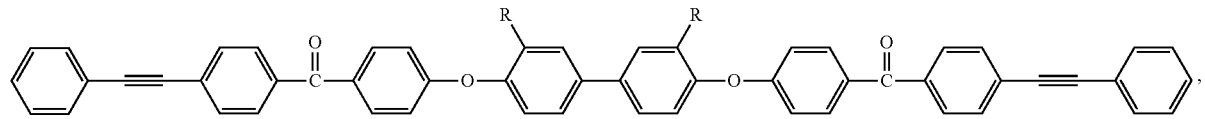

wherein the substituent R is hydrogen or methyl.

Another embodiment of the disclosed technology provides a liquid crystal synthesis composition for synthesizing a self-crosslinkable liquid crystal oligomer, comprising: 4-fluoro-4'-phenylethynyl benzophenone capping agent, 4,4'-dihydroxybiphenyl or 3,3'-dimethyl-4,4'-dihydroxybiphenyl, an alkali metal catalyst, and solvent.

Further another embodiment of the disclosed technology provides a method for preparing a self-crosslinkable liquid crystal oligomer, comprising: adding 4,4'-dihydroxybiphenyl or 3,3'-dimethyl-4,4'-dihydroxybiphenyl to an organic solvent while adding an alkali metal catalyst, allowing azeotropic distillation under the protection of a non-reactive gas for 2 to 3 hours, introducing 4-fluoro-4'-phenylethynyl benzophenone capping agent to continue for 2 to 4 hours, and discharging the resulting phenylacetylene terminated liquid crystal oligomer in an acidic aqueous solution, thereby after washing and drying obtaining the self-crosslinkable liquid crystal oligomer in a powder form.

Still further another embodiment of the disclosed technology provides a liquid crystal material, which is formed from the above mentioned self-crosslinkable liquid crystal oligomer or the above mentioned liquid crystal synthesis composition.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Figure 1:
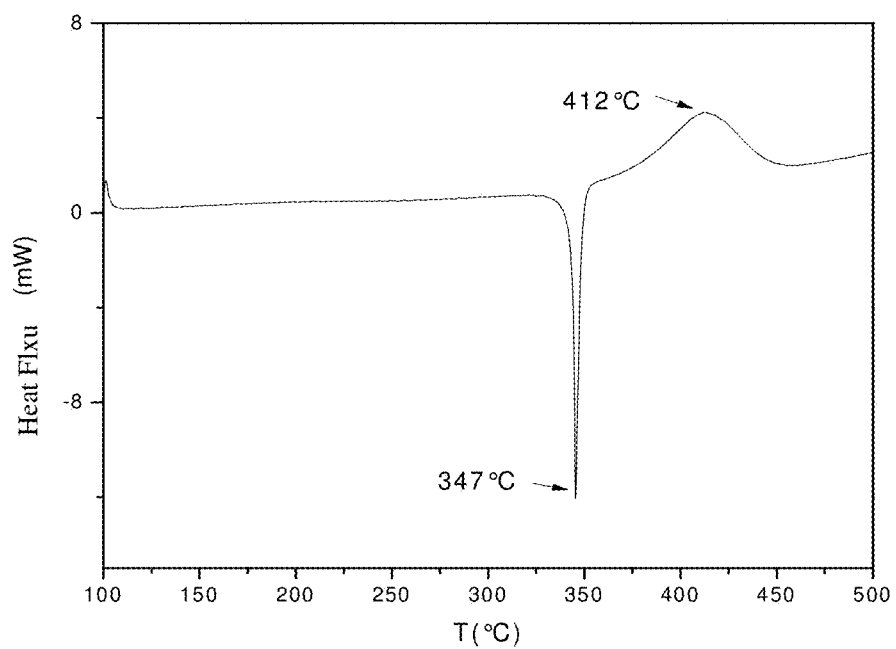
FIG. 1 shows a DSC analysis curve of the phenylacetylene capped liquid crystal oligomer obtained in Example 1 according to the disclosed technology.

With respect to the problem of high temperature display, the inventors conducted a comprehensive study and found that, by introducing the phenylacetylenyl crosslinking groups into the liquid crystal molecules with a biphenyl structure, phenylacetylenyl groups can be cross-linked at a temperature above the melting point of the liquid crystal material to form a mesh texture structure. The mesh texture structure can improve the thermal stability of the liquid crystal material, and thus it can be used at high temperatures, achieving the object of the disclosed technology.

An embodiment of the disclosed technology provides a self-crosslinkable liquid crystal oligomer. The oligomer is represented by the following chemical formula:

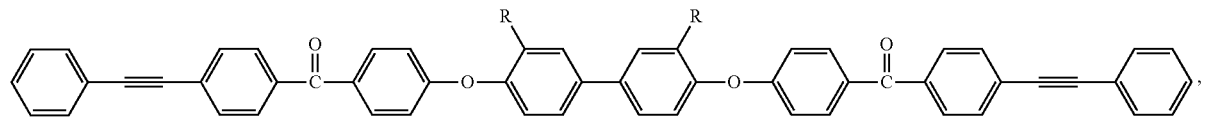

wherein the substituent R is hydrogen or methyl.

By introducing a phenyl acetylene structure into the liquid crystal molecules, the self-crosslinkable liquid crystal oligomer according the embodiment can improve the thermal stability and the liquid crystal state temperature of the liquid crystal molecules, and make the orientation of the liquid crystal molecules more stable after crosslinking, and also facilitate the ribbing orientation process.

Another embodiment of the disclosed technology provides a liquid crystal synthesis composition for synthesizing the above described self-crosslinkable liquid crystal oligomer. The liquid crystal synthesis composition comprises: 4-fluoro-4'-phenylethynyl benzophenone capping agent, 4,4'-dihydroxybiphenyl or 3,3'-dimethyl-4,4'-dihydroxybiphenyl, an alkali metal catalyst, and solvent.

After an in-depth study, the inventors found that with 4-fluoro-4'-phenylethynyl benzophenone as a capping agent, styryl groups can be introduced into the liquid crystal molecules through a simple reaction, and the liquid crystal oligomers can be successfully prepared by selecting appropriate liquid crystal molecules. The liquid crystal molecule in the composition according to the embodiment may be 4,4'-dihydroxybiphenyl or 3,3'-dimethyl-4,4'-dihydroxybiphenyl. If the substituents on the dihydroxybiphenyl are asymmetric, the substitution positions are not 3,3'-, the carbon chain is too long, or the polarity is too large, the chemical properties of the dihydroxybiphenyl will be affected, compromising the preparation of the liquid crystal oligomers of the embodiment. Furthermore, the liquid crystal synthesis composition according to the embodiment has advantages such as readily available raw materials and low-cost.

In an example, the alkali metal catalyst is alkali metal carbonate.

In an example, the alkali metal carbonate is potassium carbonate.

In an example, the solvent is N-methylpyrrolidone or sulfolane.

Further another embodiment of the disclosed technology provides a method for preparing a self-crosslinkable liquid crystal oligomer. The method comprises: adding 4,4'-dihydroxybiphenyl or 3,3'-dimethyl-4,4'-dihydroxybiphenyl to an organic solvent while adding an alkali metal catalyst, allowing azeotropic distillation under the protection of a non-reactive gas for 2 to 3 hours, introducing 4-fluoro-4'-phenylethynyl benzophenone capping agent to continue for 2 to 4 hours, and discharging the resulting phenylacetylene terminated liquid crystal oligomer in an acidic aqueous solution, thereby obtaining the self-crosslinkable liquid crystal oligomer in a powder form after washing and drying. Without being bound by any theory, it is believed that an alkali metal salt is formed while water present in the reaction mixture or formed during the reaction is gradually removed by the azeotropic distillation.

Through the preparation method according to the embodiment, the self-crosslinking liquid crystal oligomers as described above can be prepared. The oligomers can be prepared by a preparation method according to the embodiment through a nucleophilic substitution reaction in simple steps, and the reaction condition is easy to control, thereby facilitating the realization of a large-scale industrial manufacture.

In an example, the alkali metal catalyst is the alkali metal carbonate.

In an example, the alkali metal carbonate is potassium carbonate.

In an example, the organic solvent is methylpyrrolidone or sulfolane.

In an example, the total amount of the 4,4'-dihydroxybiphenyl or 3,3'-dimethyl-4,4'-dihydroxybiphenyl and the 4-fluoro-4'-phenyl ethynyl benzophenone capping agent used is from 0.20 g/ml to 0.25 g/ml, relative to the volume of the solvent.

In an example, the acidic aqueous solution is hydrochloric acid aqueous solution at a concentration of 0.1~0.2 mol/L.

In an example, the raw materials are dehydrated at the same time of azeotropic distillation.

In an example, the dehydration is accomplished by toluene reflux, and the toluene is removed by heating prior to the introduction of the capping agent. The reaction can be facilitated by the removal of the water remained in the raw materials.

In an example, the reaction temperature after introducing the capping agent is controlled at 160~170° C. The control of the temperature in the range between 160° C. to 170° C. may accelerate the reaction velocity, improve the degree of completion of the reaction, and increase the yield of the product.

Still further another embodiment of the disclosed technology provides a liquid crystal material. The liquid crystal material may be formed from the above mentioned self-crosslinkable liquid crystal oligomer or from the above mentioned liquid crystal synthesis composition. The self-crosslinkable liquid crystal oligomer of the embodiment can be prepared from the above-mentioned liquid crystal synthesis composition by heating the self-crosslinkable liquid crystal oligomer to the temperature above the melting point thereof until the crosslinking temperature of phenylacetylene so that the crosslinking of the phenylacetylene groups occurs to provide a liquid crystal material. The liquid crystal material can realize a function of displaying even at a higher temperature, and enable a more stable orientation of the liquid crystal molecules.

According to the embodiments of the disclosed technology, phenylacetylene cross-linking groups can be introduced into the liquid crystal molecules containing biphenyl structure, and the resultant liquid crystal material can form a liquid crystalline state at a temperature above its melting point.

After the temperature is heated to a temperature that the crosslinking of phenylethynyl groups occurs, the liquid crystal molecules form, by crosslinking, a relatively stable orientation of mesh texture structure, which enables a more stable orientation of the liquid crystal molecules, and is more advantageous to the arrangement within a liquid crystal cell. This kind of liquid crystal materials have a very high thermal stability due to its own structure and the crosslinking reaction, so that the phenomena, e.g., the decomposition and sublimation of the materials, do not occur even in the liquid crystalline state at a high temperature; therefore, they have broad, prospective applications in the field of high temperature display.

According to embodiments of the disclosed technology, through introduction of phenylacetylene crosslinking groups into the liquid crystal molecules containing biphenyl structure, the phenylacetylene groups crosslink at a temperature above the melting point of the liquid crystal material to form a mesh texture structure, thereby an improved thermal stability of the liquid crystal material and a more stable orientation of the liquid crystal molecules can be obtained.

The embodiments of the disclosed technology will be further illustrated in the followings in connection with the accompanying drawings, but the scope of the disclosed technology is not limited to these embodiments.

Embodiment 1

According to the preparation method described in the reference "R. G. Bryant, B. J. Jensen and P. M. Hergenrother, *Polym. Prepr.,* 33(1), 910 (1992)", 4-fluoro-4'-phenylethynyl benzophenone (FPEB) is prepared as follows. First, p-bromobenzoyl chloride (Beijing Chemical Reagent First Factory, analytically pure) and fluorobenzene (Beijing Chemical Reagent First Factory, analytically pure), used as raw material, with aluminum trichloride (Shanghai Reagent Fourth Factory, analytically pure) as catalyst, are reacted under a Fourier acylation to produce 4-fluoro-4'-bromo diphenyl ketone; then 4-fluoro-4'-bromo diphenyl ketone is coupled with phenylacetylene (Aldrich Chemical Company Inc, analytically pure) at 80 centigrade (° C.) while catalyzed in a Pd/Cu catalysis system and next recrystallized to produce FPEB. The reactions are shown by the following reaction formulae. The Pd/Cu catalysis system is obtained from dissolving 0.1 g P(Ph)$_3$, 0.05 g of PdCl$_2$(PPh$_3$)$_2$ and 0.05 g of CuI in about 200 ml of triethylamine (TEA) (where Ph represents phenyl), and these chemicals are all purchased from Aldrich Chemical Company. Inc., analytically pure.

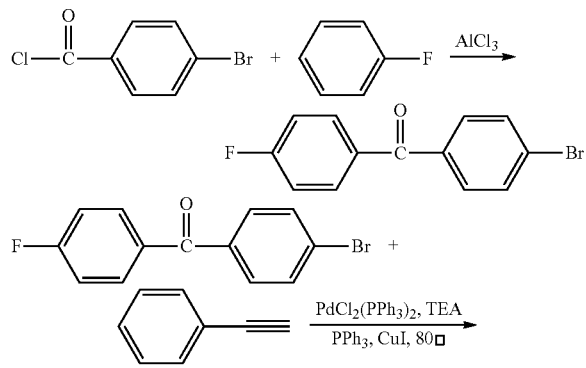

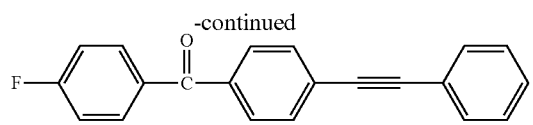

0.005 mol (0.9311 g) of 4,4'-dihydroxybiphenyl monomers (Dalian Chemical Factory, analytically pure), 0.01 mol (1.38 g) of anhydrous potassium carbonate (Tianjin Chemical Reagent Factory, analytically pure), 20 ml of N-methylpyrrolidone (Tianjin Dengfeng Chemical Reagent Factory, analytically pure) and 10 ml of toluene (Beijing Chemical Reagent First Factory, analytically pure) are placed into a 100 ml three-neck flask equipped with a mechanical stirring, a nitrogen through hole, a dean-stark trap and a reflux condenser. Then the composition is heated to reflux toluene for 2 hours at a reflux temperature controlled at 140 to 145° C., and then heated up to 160° C. to remove toluene by evaporation. Afterwards, in the result, 0.0105 mol (3.15 g) of 4-fluoro-4'-phenylethynyl benzophenone (FPEB) prepared as mentioned above is added, and the reaction temperature is controlled at 160~170° C. to continue the reaction for 4 hours. Finally, the resulting mixture is discharged into a 0.1 mol/L hydrochloric acid aqueous solution, then washed repeatedly with ethanol and deionized water, and next dried at 120° C. in an oven for 12 hours, to afford 3.55 g of phenylacetylene capped liquid crystal oligomer as a yellow powdery solid. The yield is about 87%, calculated based on the mass ratio of the resulting liquid crystal oligomer and the raw materials, i.e., dihydroxybiphenyl monomers and 4-fluoro-4'-phenylethynyl benzophenone (FPEB).

Embodiment 2

3.76 g of phenylacetylene capped liquid crystal oligomer is afforded with a yield of about 89% from the same operation as described in Example 1, except that 4,4'-dihydroxybiphenyl is replaced by equimolar amount of 3,3'-dimethyl-4,4'-dihydroxybiphenyl (Dalian Chemical Factory, analytically pure).

Embodiment 3

3.47 g of phenylacetylene capped liquid crystal oligomer is afforded with a yield of about 85% from the same operation as described in Example 1, except that the organic solvent N-methylpyrrolidone (NMP) is replaced with equal volume of sulfolane (TMS) (Jinzhou refinery, industrially pure).

Analysis 1

2.5 mg of liquid crystal oligomer obtained in Example 1 are placed into a DSC 821e-type thermal analyzer (Mettler Toledo Company, Switzerland) for analysis. The obtained DSC curve as shown in FIG. 1 has an endothermic peak at 347° C., corresponding to the melting point of the liquid crystal oligomer, and has an exothermic peak at 412° C., corresponding to the crosslinking reaction of the phenylethynyl groups. Similar results can be obtained in the DSC analyses of the liquid crystal oligomer obtained in Example 2 or 3.

Analysis 2

Figure 2:
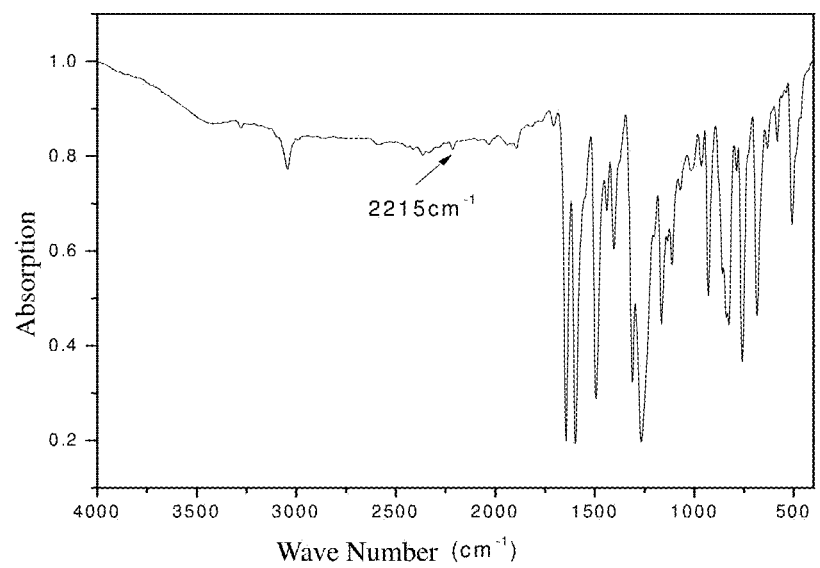
FIG. 2 shows an infrared spectra of the phenylacetylene capped liquid crystal oligomer obtained in Example 1 according to the disclosed technology.
Figure 3:
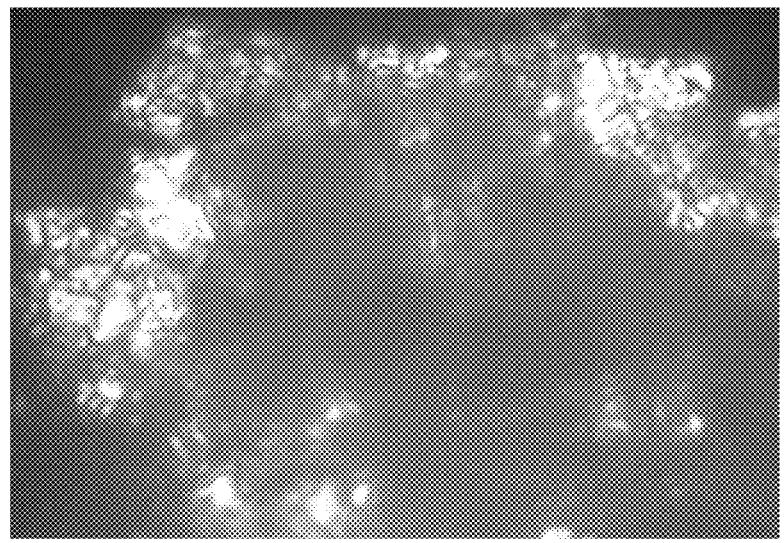
FIG. 3 shows polarizing microscope photographs, taken at ordinary temperature, of the phenylacetylene capped liquid crystal oligomer obtained in Example 1 according to the disclosed technology.
Figure 4:
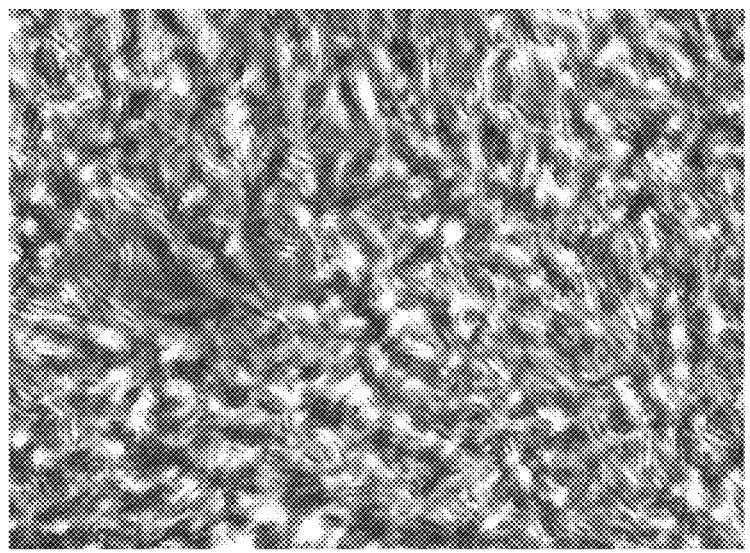
FIG. 4 shows polarizing microscope photographs, taken at a temperature of heating up to the melting point, of the phenylacetylene capped liquid crystal oligomer obtained in Example 1 according to the disclosed technology.
Figure 5:
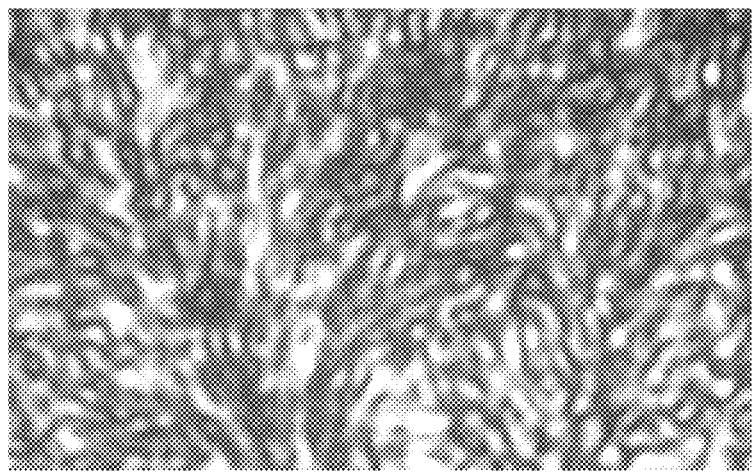
FIG. 5 shows polarizing microscope photographs, taken at 370° C., of the phenylacetylene capped liquid crystal oligomer obtained in Example 1 according to the disclosed technology.
Figure 6:
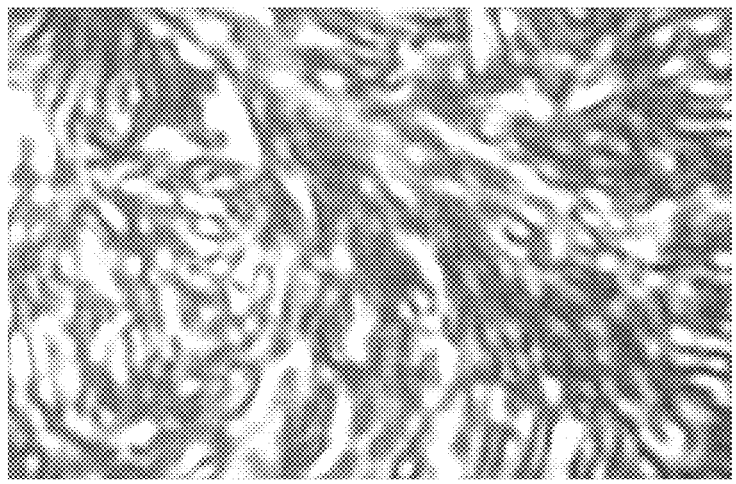
FIG. 6 shows polarizing microscope photographs, taken at 345° C., of the phenylacetylene capped liquid crystal oligomer obtained in Example 1 according to the disclosed technology.
Figure 7:
FIG. 7 shows polarizing microscope photographs, taken at 320° C., of the phenylacetylene capped liquid crystal oligomer obtained in Example 1 according to the disclosed technology.

Some sample of the liquid crystal oligomer obtained in Example 1 is placed into a Nicolet Impact 410 Fourier transform infrared spectroscopy (US) for analysis. The obtained IR spectra as shown in FIG. 2 has an absorption peak at 2215 cm$^{-1}$ corresponding to the phenylethynyl absorption peak, an absorption peak at 1643 cm$^{-1}$ corresponding to the carbonyl absorption peak, an absorption peak at 1250 cm$^{-1}$ corresponding to the ether bond absorption peak. In addition, the absorption peak at 3000 cm$^{-1}$ or above representing the hydroxyl group is very weak, and there is little moisture present in the corresponding samples. Similar results can be obtained in the infrared spectrum analyses of liquid crystal oligomer obtained in Example 2 or 3.

Analysis 3

1 mg of the liquid crystal oligomer obtained in Example 1 are clamped between two glass slides, observed and photographed under a hot stage polarizing microscope (Leica DMLP, equipped with a Linkam THMS 600 hot stage, Germany). Afterwards, the liquid crystal oligomer observed is heated up to be melted and photographed again. Heating up is continued until 420° C. to crosslink the phenylacetylene groups and then the result is cooled at a cooling speed of 5° C./min, during the period photos are taken every 5 minutes. The taken polarizing microscope photos are shown in FIGS. 3 to 7. By comparing FIG. 3 and FIG. 4, it can be found that the liquid crystal oligomer of the disclosed technology shows a significant liquid crystal state at a temperature above its melting point, showing that this material can be used as a liquid crystal material. After the phenylethynyl groups contained in the liquid crystal oligomer are crosslinked, it can be clearly observed at a temperature ranging from 420° C. to 345° C. that, while maintaining the liquid crystal state, the liquid crystal oligomer shows a texture structure that still can be observed even after cooled to 300° C.

It can be known from the analysis results of embodiments 1 to 3 that liquid crystal materials with a good heat resistance can be obtained in the examples; the phenomena, e.g., the decomposition and sublimation of the liquid crystal material, do not occur even in the liquid crystalline state at a high temperature. Therefore, these materials have broad, prospective applications in the field of high temperature display.

Embodiment 4

The embodiment 4 of the disclosed technology disclosed a liquid crystal display which use any liquid crystal material obtained in the above embodiments 1-3. The layer of the liquid crystal material is interposed between a color filter substrate and an array substrate, for example, and can change light transmission levels for display when different voltages are applied across the liquid crystal material layer. The display can work at a high temperature.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. A method for preparing a self-crosslinkable liquid crystal oligomer, comprising:
    adding 4,4'-dihydroxybiphenyl or 3,3'-dimethyl-4,4'-dihydroxybiphenyl into an organic solvent while adding an alkali metal catalyst,
    allowing azeotropic distillation under the protection of a non-reactive gas for 2 to 3 hours,
    introducing 4-fluoro-4'-phenylethynyl benzophenone capping agent to continue for 2 to 4 hours, and
    discharging the resulting phenylacetylene terminated liquid crystal oligomer in an acidic aqueous solution, thereby after washing and drying obtaining the self-crosslinkable liquid crystal oligomer in a powder form.

2. The method according to claim 1, wherein the alkali metal catalyst is the alkali metal carbonate.

3. The method according to claim 2, wherein the alkali metal carbonate is potassium carbonate.

4. The method according to claim 1, wherein the organic solvent is methyl pyrrolidone or sulfolane.

5. The method according to claim 1, wherein the total amount of the 4,4'-dihydroxybiphenyl or 3,3'-dimethyl-4,4'-dihydroxybiphenyl and the 4-fluoro-4'-phenylethynyl benzophenone capping agent used is from 0.20 g/ml to 0.25 g/ml, relative to the volume of the solvent.

6. The method according to claim 1, wherein the acidic aqueous solution is hydrochloric acid aqueous solution at a concentration of 0.1~0.2 mol/L.

7. The method according to claim 1, wherein the raw materials are dehydrated at the same time of azeotropic distillation.

8. The method according to claim 7, wherein the dehydration is accomplished by toluene reflux, and the toluene is removed by heating prior to the introduction of the capping agent.

9. The method according to claim 1, wherein the reaction temperature after introducing the capping agent is controlled in a range of 160~170° C.

* * * * *